United States Patent
Gomez et al.

(10) Patent No.: US 6,761,756 B1
(45) Date of Patent: Jul. 13, 2004

(54) AIR PURIFICATION SYSTEM FOR A CENTRAL AIR CONDITIONING UNIT

(76) Inventors: Sandy Gomez, 226-7$^{TH}$ St. #1, Hialeah, FL (US) 33010; Rafael Gomez, 226-7$^{TH}$ St. #1, Hialeah, FL (US) 33010

( * ) Notice: Subject to any disclaimer, the term of this patent is extended or adjusted under 35 U.S.C. 154(b) by 36 days.

(21) Appl. No.: 10/127,809

(22) Filed: Apr. 23, 2002

(51) Int. Cl.$^7$ ............................................. B01D 47/02
(52) U.S. Cl. ....................................... 96/329; 95/226
(58) Field of Search ..................... 261/114.2; 95/210, 95/213, 226; 96/290, 296, 297, 299, 329

(56) References Cited

U.S. PATENT DOCUMENTS

| | | | |
|---|---|---|---|
| 1,107,803 A | * | 8/1914 | Koppers |
| 2,029,277 A | * | 1/1936 | Scoville |
| 2,366,958 A | * | 1/1945 | Dennis |
| 2,391,464 A | * | 12/1945 | Larsen |
| 2,576,946 A | * | 12/1951 | La Croix |
| 2,578,881 A | * | 12/1951 | Dunn |
| 2,710,177 A | * | 6/1955 | Young et al. |
| 2,785,882 A | * | 3/1957 | Wansink et al. |
| 3,397,513 A | * | 8/1968 | Ephraim, Jr. et al. |
| 5,520,714 A | * | 5/1996 | Muschelknautz |

* cited by examiner

Primary Examiner—Duane S. Smith

(57) ABSTRACT

An air purification system for a central air conditioning unit for effectively purifying air for central air conditioning systems. The air purification system for a central air conditioning unit includes a pan assembly including a pan member having bottom and side walls, and also having a plurality of ports being spaced about and being disposed through the bottom wall with the pan member being adapted to hold water and to be disposed in a duct for a central air conditioning system; and also includes a plurality of air intake members being disposed in the ports of the pan member; and further includes cap assemblies including a plurality of tubular cap members being spaced above and disposed about the air intake members.

10 Claims, 2 Drawing Sheets

AIR PURIFICATION SYSTEM FOR A CENTRAL AIR CONDITIONING UNIT

BACKGROUND OF THE INVENTION

1. Field of the Invention

The present invention relates to air purification units for air conditioning systems and more particularly pertains to a new air purification system for a central air conditioning unit for effectively purifying air for central air conditioning systems.

2. Description of the Prior Art

The use of air purification units for air conditioning systems is known in the prior art. More specifically, air purification units for air conditioning systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 6,036,755; 5,215,560; 6,000,557; 3,672,126; 5,509,946; and 5,389,120.

While these devices fulfill their respective, particular objectives and requirements, the aforementioned patents do not disclose a new air purification system for a central air conditioning unit, The prior art includes inventions having housings and a series of conduits and filters where air passes through.

SUMMARY OF THE INVENTION

The general purpose of the present invention, which will be described subsequently in greater detail, is to provide a new air purification system for a central air conditioning unit which has many of the advantages of the air purification units for air conditioning systems mentioned heretofore and many novel features that result in a new air purification system for a central air conditioning unit which is not anticipated, rendered obvious, suggested, or even implied by any of the prior art air purification units for air conditioning systems, either alone or in any combination thereof. The present invention includes a pan member having bottom and side walls, and also having a plurality of ports being spaced about and being disposed through the bottom wall with the pan member being adapted to hold water and to be disposed in a duct for a central air conditioning system; and also includes a plurality of air intake members being disposed in the ports of the pan member; and further includes cap assemblies including a plurality of tubular cap members being spaced above and disposed about the air intake members. None of the prior art includes sleeves and tubular cap members to filter the air.

DESCRIPTION OF THE PREFERRED EMBODIMENT

Figure 1:
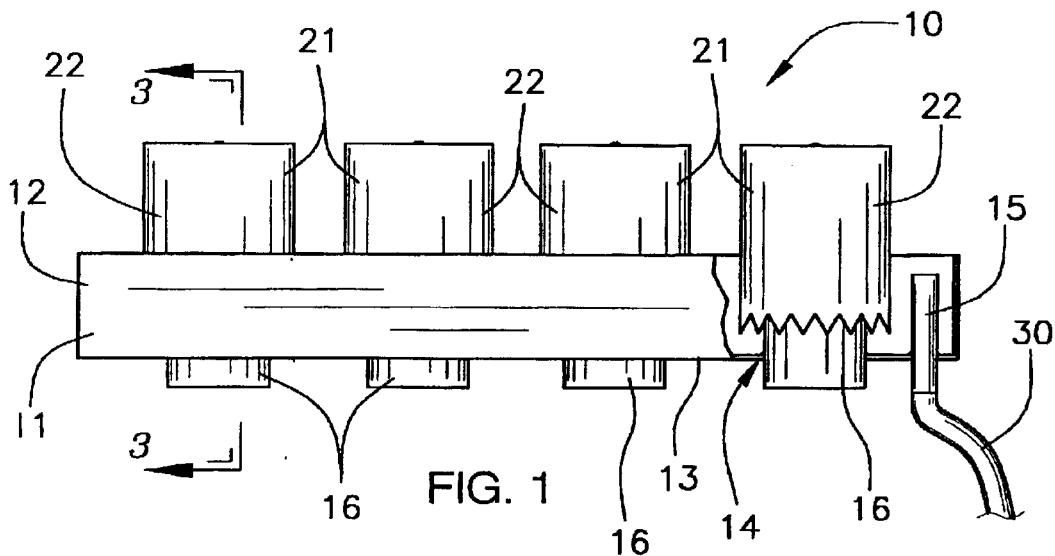
FIG. 1 is a side elevational view of a new air purification system for a central air conditioning unit according to the present invention.
Figure 2:
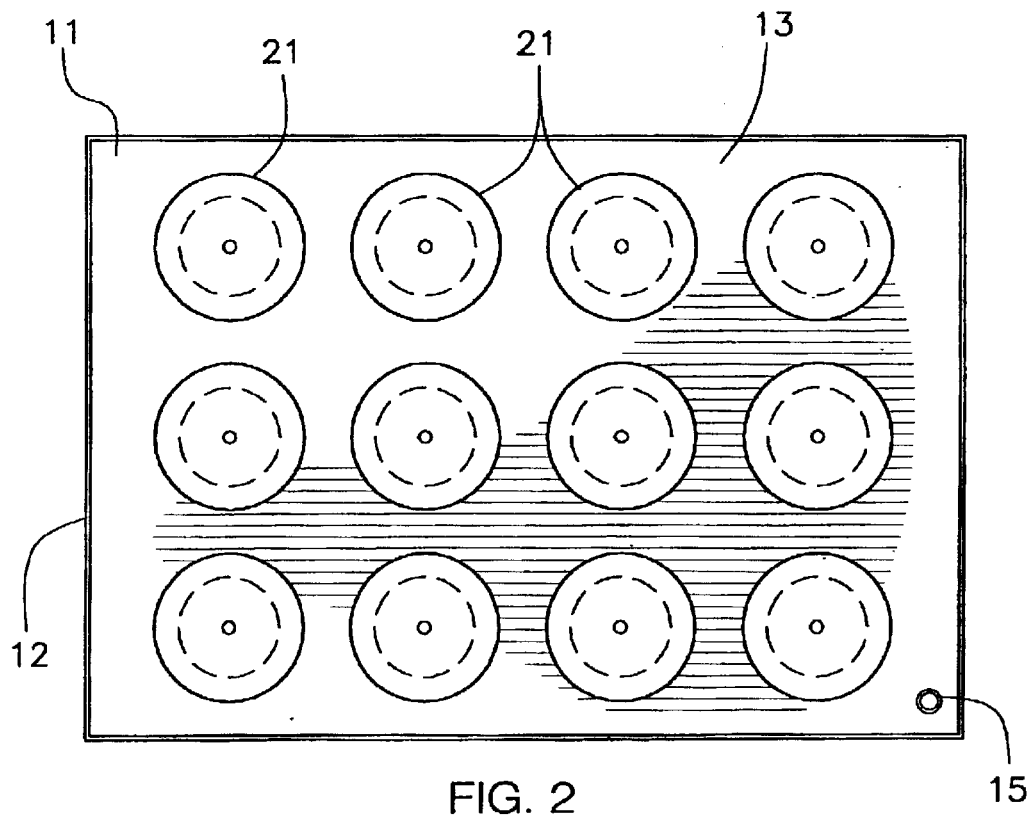
FIG. 2 is a top plan view of the scoring system of the present invention.
Figures 3, 4:
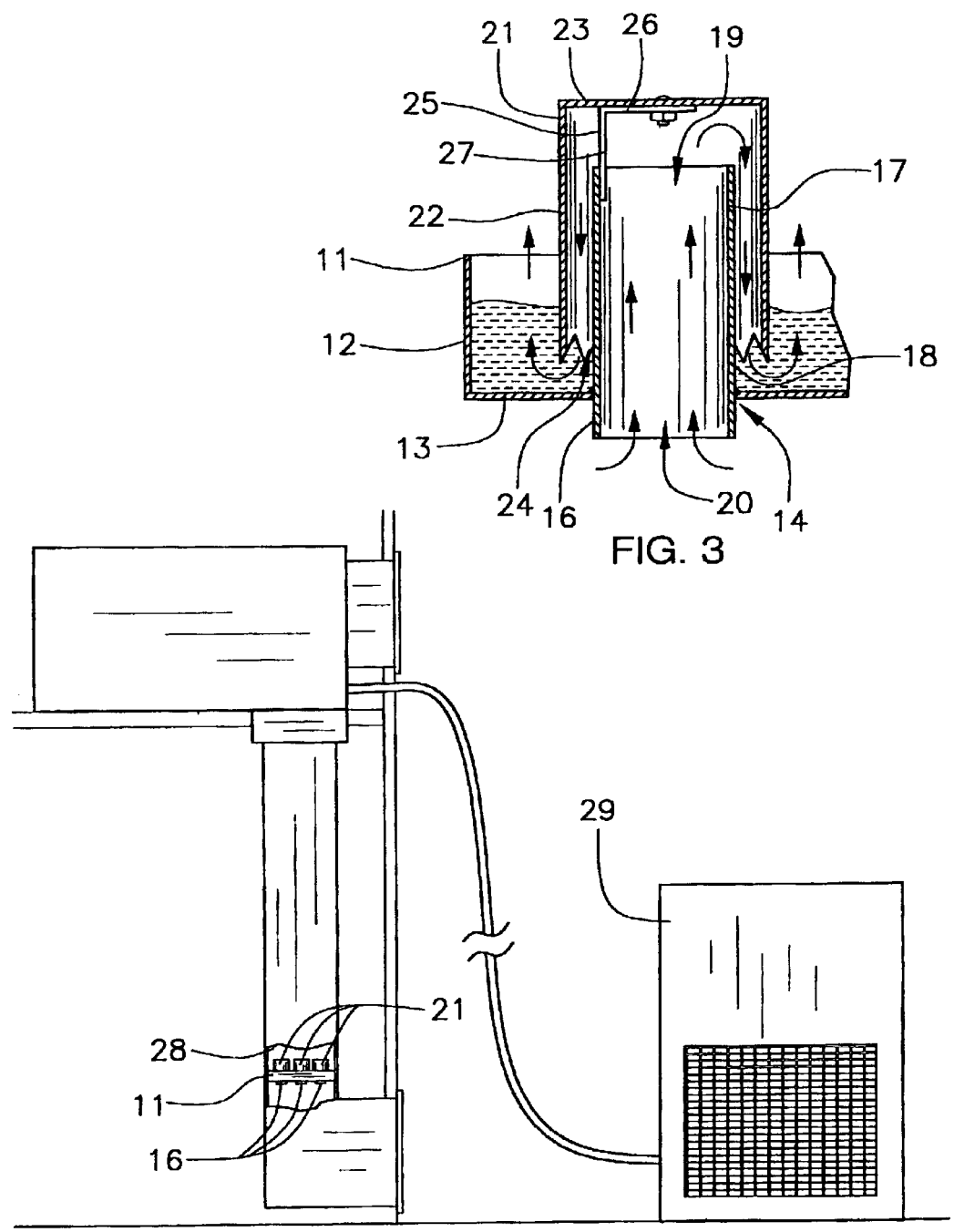
FIG. 3 is a detailed cross-sectional view of a tubular cap member and a sleeve member of the present invention shown in use.
FIG. 4 is a side elevational view of the present invention shown in use.

With reference now to the drawings, and in particular to FIGS. 1 through 4 thereof, a new air purification system for a central air conditioning unit embodying the principles and concepts of the present invention and generally designated by the reference numeral 10 will be described.

As best illustrated in FIGS. 1 through 4, the air purification system for a central air conditioning unit 10 generally comprises a pan assembly including a pan member 11 having bottom and side walls 12,13, and also having a plurality of ports 14 being spaced about and being disposed through the bottom wall. The pan member 11 is adapted to hold water and to be disposed in a duct 28 for a central air conditioning system 29. The pan assembly also includes a tubular drainage member 15 being conventionally disposed through the bottom wall 13 of the pan member 11 and being adapted to conventionally connect to a drainage hose 30. The tubular elongate first portion 26 and being conventionally attached and welded to a respective sleeve 16.

In use, air is sucked by a blower for the air conditioning unit through the sleeves 16 and is passed through the condensate or water contained in the pan member 11 which filters the air.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the air purification system for a central air conditioning unit. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An air purification system for a central air conditioning unit comprising:
    a pan assembly including a pan member having bottom and side walls, and also having a plurality of ports being spaced about and being disposed through said bottom wall, said pan member holding water and being disposed in a duct of a central air conditioning system;
    a plurality of air intake members being disposed in said ports of said pan member; and
    cap assemblies including a plurality of tubular cap members being spaced above and disposed about said air intake members.

2. An air purification system for a central air conditioning unit as described in claim 1, wherein said pan assembly also includes a tubular drainage member being disposed through said bottom wall thereof and being adapted to connect to a drainage hose.

3. An air purification system for a central air conditioning unit as described in claim 2, wherein said tubular drainage member has open ends and has an upper portion which extends above said bottom wall of said pan member.

4. An air purification system for a central air conditioning unit as described in claim 1, wherein said air intake members are sleeves having open top and bottom ends and having upper and intermediate portions extending above said bottom wall of said pan member with said top ends being adapted to be disposed above the water level in said pan member.

5. An air purification system for a central air conditioning unit as described in claim 4, wherein each of said tubular cap members has side and top walls, and also has an open bottom end, said top walls of said tubular cap members being spaced above said open top ends of said sleeves.

6. An air purification system for a central air conditioning unit as described in claim 5, wherein said side walls of said tubular cap members being spaced from said side walls of said sleeve thus forming a channel therebetween for air to pass through.

7. An air purification system for a central air conditioning unit as described in claim 6, wherein said tubular cap members have bottom portions which are adapted to be disposed in the water contained in said pan member, and are suspended above said bottom wall of said pan member.

8. An air purification system for a central air conditioning unit as described in claim 7, wherein said cap assemblies includes a plurality of bracket members being attached to said tubular cap members and to said sleeves for supporting said tubular cap members.

9. An air purification system for a central air conditioning unit as described in claim 8, wherein each of said tubular cap members has a diameter greater than that of a respective said sleeve.

10. An air purification system for a central air conditioning unit as described in claim 8, wherein each of said bracket members includes an elongate first portion being attached to an underside of said top wall of a respective said tubular cap member, and also includes an elongate second portion being angled relative to said elongate first portion and being attached to a respective said sleeve.

\* \* \* \* \*